United States Patent [19]
Fujita et al.

[11] Patent Number: 4,884,938
[45] Date of Patent: Dec. 5, 1989

[54] APPARATUS FOR HANDLING LARGE-SIZED ARTICLES

[75] Inventors: Yoshitada Fujita, Kobe; Sadashi Hanada, Miki; Yoshiaki Yamamoto, Kobe, all of Japan

[73] Assignee: Kawasaki Jukogyo Kabushiki Kaisha, Japan

[21] Appl. No.: 256,467

[22] Filed: Oct. 12, 1988

Related U.S. Application Data

[63] Continuation-in-part of Ser. No. 936,961, Dec. 1, 1986, abandoned, which is a continuation of Ser. No. 714,219, Mar. 21, 1985, abandoned.

[51] Int. Cl.$^4$ .................... B66F 11/00; B66C 23/00
[52] U.S. Cl. .................... 414/541; 414/752; 414/684.3; 414/590; 414/11; 901/16; 901/40
[58] Field of Search .................... 414/10, 11, 589, 590, 414/591, 684.3, 751, 752, 541; 901/14, 16, 40

[56] References Cited

U.S. PATENT DOCUMENTS

| | | | | |
|---|---|---|---|---|
| 1,190,036 | 7/1916 | Stauft | ..................... | 212/166 |
| 1,397,736 | 11/1921 | Krippner | ..................... | 212/166 |
| 3,043,448 | 7/1962 | Melton | ..................... | 901/14 X |
| 3,361,280 | 1/1968 | Traver | ..................... | 414/11 X |
| 3,409,158 | 11/1968 | Lull | ..................... | 414/590 X |
| 3,637,092 | 1/1972 | George et al. | ..................... | 901/40 X |
| 3,665,148 | 5/1972 | Yasenchak et al. | ..................... | 901/16 X |
| 3,857,497 | 12/1974 | Shannon, Jr. | ..................... | 414/11 |
| 4,089,424 | 5/1978 | Steimann et al. | ..................... | 212/166 |
| 4,452,351 | 6/1984 | Meeker | ..................... | 414/590 X |
| 4,527,942 | 7/1985 | Smith | ..................... | 414/590 |
| 4,676,713 | 6/1987 | Voelpel | ..................... | 414/590 |

FOREIGN PATENT DOCUMENTS

| | | | | |
|---|---|---|---|---|
| 60-70471 | 5/1985 | Japan . | | |
| 1129067 | 12/1984 | U.S.S.R. | ..................... | 414/590 |
| 1133209 | 1/1985 | U.S.S.R. | ..................... | 901/40 |
| 1068514 | 5/1967 | United Kingdom | ..................... | 294/64.1 |

*Primary Examiner*—Robert J. Spar
*Assistant Examiner*—Robert S. Katz
*Attorney, Agent, or Firm*—Leydig, Voit & Mayer

[57] ABSTRACT

An apparatus for handling a large-sized article such as a window assembly for a car has a carriage movable three-dimensionally in X-, Y- and Z-directions, and a vacuum holding device tiltably and fixably secured to the carriage. This apparatus conveys the article to a remote place and holds it while it is being secured to an object such as the wall of a car, thus improving the efficiency and safety of the work.

7 Claims, 7 Drawing Sheets

FIG. I
PRIOR ART
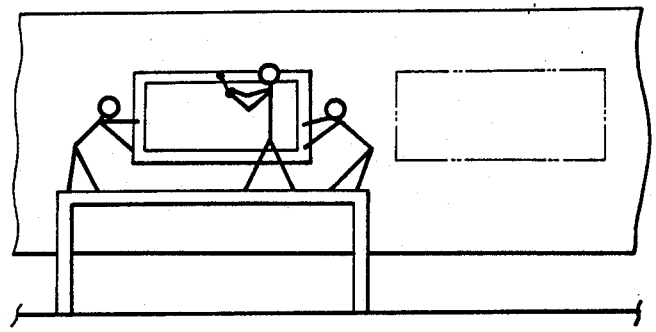
FIG. 2
PRIOR ART
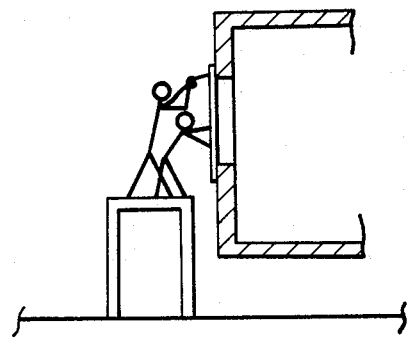

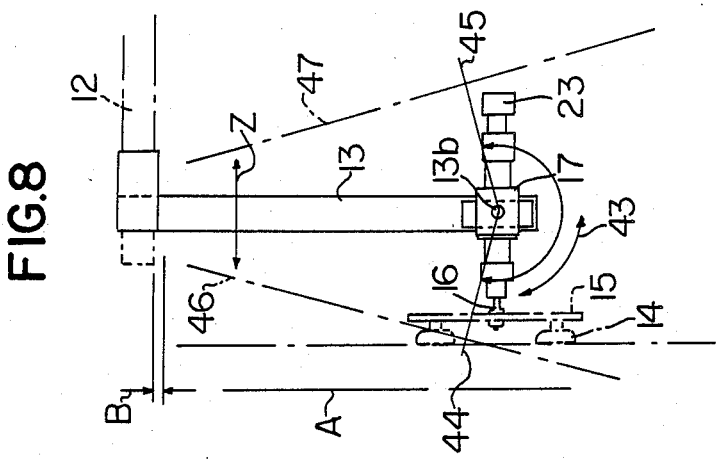
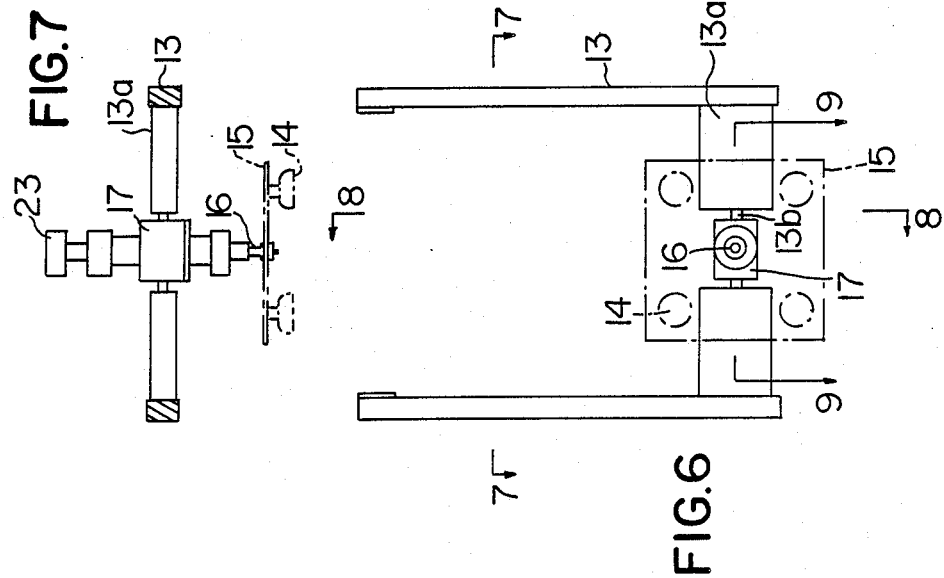

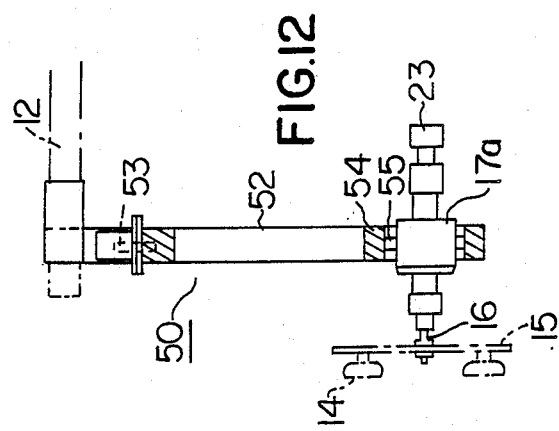
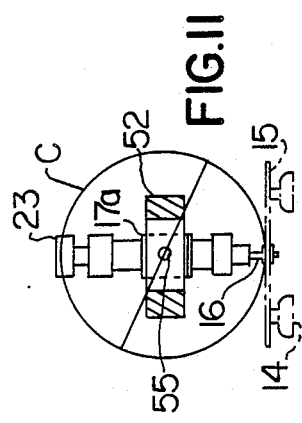
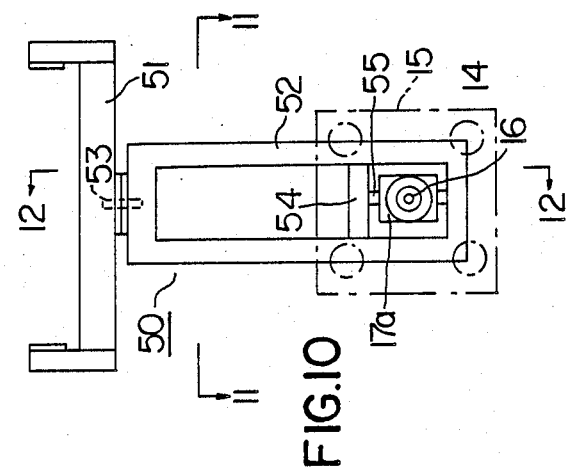

APPARATUS FOR HANDLING LARGE-SIZED ARTICLES

This application is a continuation-in-part of application Ser. No. 06/936,961, filed Dec. 1, 1986, now abhandoned, which is a continuation of application Ser. No. 06/714,219, filed Mar. 21, 1985, now abandoned.

BACKGROUND OF THE INVENTION

1. Field of the Invention

The present invention relates to an apparatus for handling large-sized articles suited to use in the handling of such large-sized articles as a glass window assembly when attaching of the same to, for example, the side wall of a rail car. More specifically, the invention is concerned with an apparatus which transports a glass window assembly from a storage location where a plurality of assemblies are stored to the site where the glass window assembly is to be mounted, moves the same three-dimensionally in X-, Y- and Z-axis directions and holds it in registration with the position on the wall of the car where the window assembly is to be mounted.

2. Description of the Prior Art

Hitherto, the mounting of a large window assembly on the wall of a vehicle has been done by two or three persons who cooperate with one another in conveying the window assemby from a store to the site and holding and fastening the same in registration with the aperture formed in the car wall. This manual mounting work encounters the following problems or deficiencies:

(a) A large labour cost is incurred due to employment of many workers.

(b) Since the window assembly is usually as heavy as about 20 to 30 kg, the workers get tired soon and cannot hold the assembly for a long time, so that they must frequently take rest which inconveniently impairs the efficiency of the work.

(c) A window assembly which is heavy and fragile cannot be handled by one person.

(d) Usually, the apertures to which the window assemblies are to be fitted are positioned high above the ground or floor surface. In order to gain access to the apertures, therefore, the workers have to use a scaffold. Since the car usually has five to six apertures arranged along the length of each side wall thereof, the scaffold has to be long enough in order to allow the workers to gain access to all apertures. Alternatively, when a short scaffold is used, it is necessary to shift the scaffold to the appropriate positions under successive apertures.

(e) The use of long scaffold extending along the side wall of the car inconveniently hinders other kinds of work which have to be done on the same side wall of the car. Therefore, the mounting of window assemblies cannot be conducted concurrently with other works.

(f) When a temporary registration of the window assembly with the framework on the car side wall is necessary, the window assembly has to be tentatively placed on the floor or the ground surface, which may cause damaging of the window frame and glass of the window assembly, thus imposing a serious problem from the view point of quality control.

(g) Supporting the window assembly by human hands alone may lead to the window assembly slipping from the grasp of the bearers and, hence, should be avoided from the view point of safety.

SUMMARY OF THE INVENTION

Accordingly, an object of the invention is to provide an apparatus for handling a large-sized article such as a glass window assembly capable of eliminating the above-described problems or deficiencies of the prior art.

To this end, according to the invention, there is provided an apparatus for handling a large-sized article comprising: a mobile truck; a supporting structure on the mobile truck; a carriage means mounted on the supporting structure for three-dimensional movement; and a vacuum suction means rotatably and fixably connected to the carriage means.

Within this arrangement, large-sized articles such as a car window assembly can be handled safely by one person alone, and the time required for the mounting work can be shortened remarkably, while relieving the worker from excessive manual labour. Thus, the invention offers various disadvantages such as saving for labor costs, improvement in working efficiency and safety, and improvement in quality control, by means of the simple and rational construction of the apparatus.

BRIEF DESCRIPTION OF THE DRAWINGS

FIG. 1 illustrates the conventional mutual labour employed in mounting a window assembly on the wall of a car as viewed in the direction normal to the plane of the car wall;

FIG. 2 is an illustration of the manual work as viewed in the direction parallel to the plane of the car wall;

FIG. 6 is an enlarged front elevation of a portion of the embodiment of FIG. 3;

FIG. 7 is a cross-sectional view taken along Line VII—VII of FIG. 6;

FIG. 8 is a side elevation taken along Line VIII—VIII of FIG. 6;

FIG. 10 is a front elevation of a portion of another embodiment of a carriage 45 in accordance with the present invention;

FIG. 11 is a cross-sectional view taken along Line XI—XI of FIG. 10; and

FIG. 12 is a partially cross-sectional side elevation taken along Line XII—XII of FIG. 10.

DESCRIPTION OF THE PREFERRED EMBODIMENTS

FIGS. 1 and 2 show, for the purpose of an easier understanding of the advantage of the invention, the conventional manual work employed in mounting a window assembly on the wall of a car. The aforementioned problems or deficiencies of the prior art will be understood from these figures.

Figure 3:
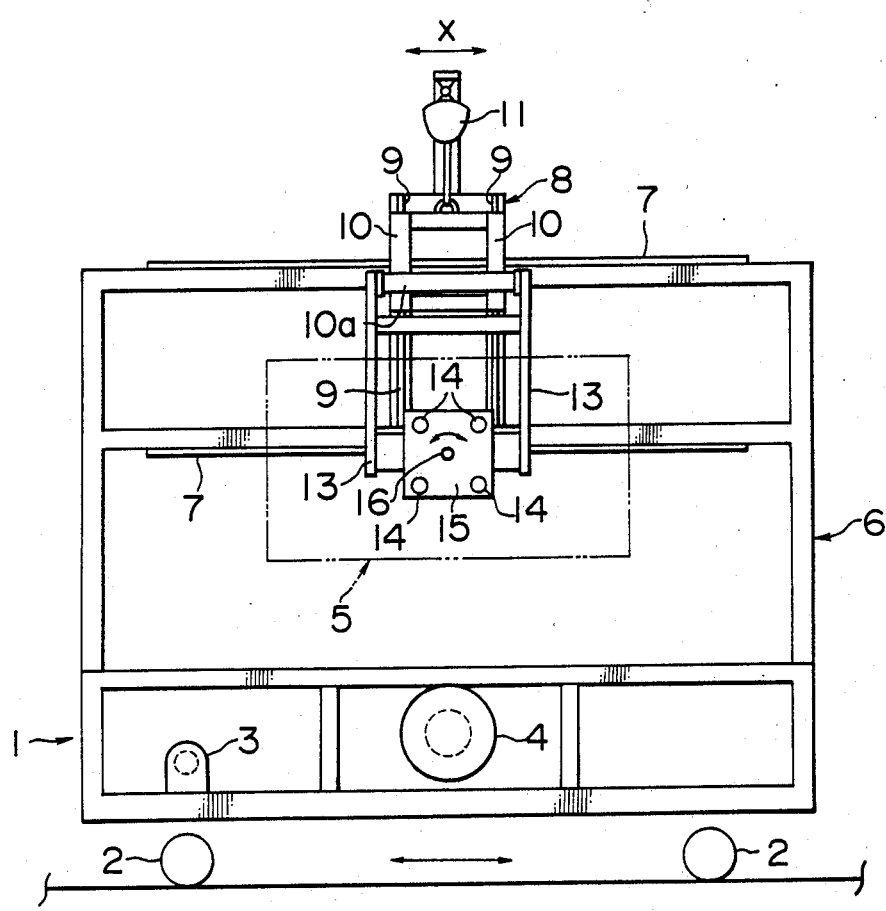
FIG. 3 is a front elevational view of an embodiment of the apparatus in accordance with the invention.
Figure 4:
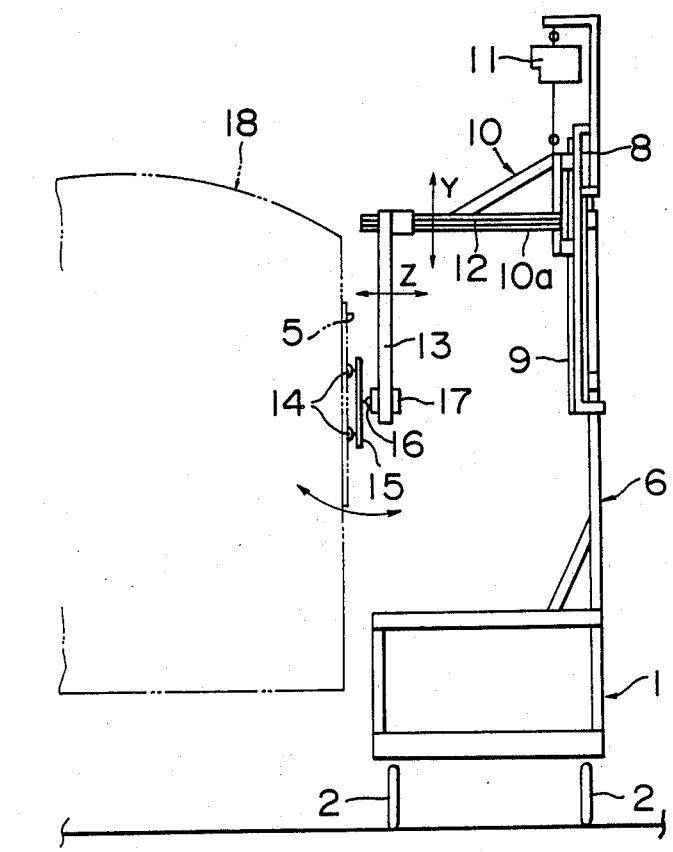
FIG. 4 is a side elevational view of the apparatus shown in FIG. 3.
Figure 5:
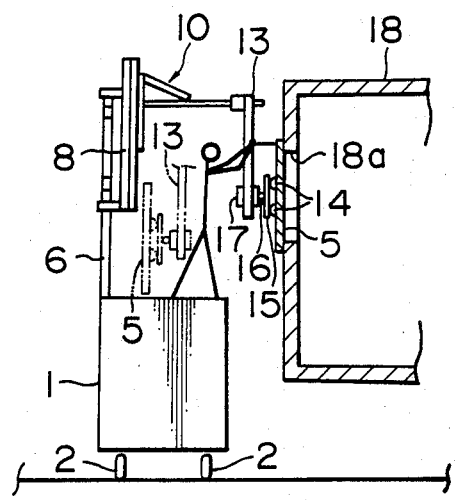
FIG. 5 is a side elevational view showing the manner in which the apparatus shown in FIG. 3 is used.

An embodiment of the invention will be described hereinunder with reference to FIGS. 3 to 5. The apparatus embodying the invention has a truck generally denoted by a numeral 1 and provided at its lower side with wheels 2. The truck 1 carries a driving unit 3 for driving the wheels 2, a brake system (not shown), a take-up reel 4 for taking up electric wires and air hoses leading to later-mentioned vacuum suction cups, and other necessaary equipment. A plurality of glass window assemblies 5 are placed on the truck 1. As will be best seen from FIG. 4, a supporting structure 6 consisting of vertical posts and horizontal girders stands upright from one longitudinal side of the truck 1. A pair of parallel rails 7 extend substantially horizontally along the horizontal girders of the supporting structure 6. A traverser 8 is mounted such as to run traversely, i.e., in the X-axis direction along the guide rails 7. The traverser 8 has a pair of vertical parallel rails 9 on the front side thereof. A lift 10 is movable up and down, i.e., in the direction of Y-axis, along these guide rails 9. As will be best seen from FIG. 4, the lift 10 has an L-shaped cross-section with its longer side 10a laid horizontally. A wire leading from an electric hoist 11 suspended from the top end of the traverser 8 is connected to the upper end of the lift 10, so that the lift 10 is moved up and down as the wire is hoisted up and down by the electric hoist 11.

A pair of guide rails 12 are attached to both side surfaces of the horizontal portion 10a of the lift 10. A mobile carriage 13 is adapted to move along these guide rails 12 back and forth, i.e., in the direction of Z-axis towards and away from a car which is denoted by a numeral 18 in FIG. 4. As shown in FIG. 3, the mobile carriage 13 has a frame-like structure elongated in the vertical direction, with its upper end held by the horizontal portion 10a of the lift 10. To the center of the lower end surface of the carriage 13, is attached a bracket 15 through a universal joint 16. Four vacuum suction cups 14 are provided on the corners of the bracket 15 on the side thereof opposite the universal joint 16. The vacuum suction cups 14 are connected to the suction side of a compressor which is not shown. The universal joint 16 incorporates a fixing device 17 for fixing the bracket 15 in any desired posture. The fixing device 17 is pivotably mounted on the lower end of the carriage 13 so as to be able to pivot about a horizontal axis as shown by the curved two-headed arrow in FIG. 4.

FIGS. 6 through 10 illustrate in detail the structure of a universal joint 16 and a fixing device 17 in accordance with one embodiment of the present invention. As shown in FIGS. 6 and 7, which are respectively an enlarged front elevation and a cross-sectional view taken along Line VII—VII of FIG. 6, the fixing device 17 is rotatably mounted on a fixed shaft 13b which is secured between two horizontal supporting members 13a which form the bottom portion of the carriage 13.

Figure 9:
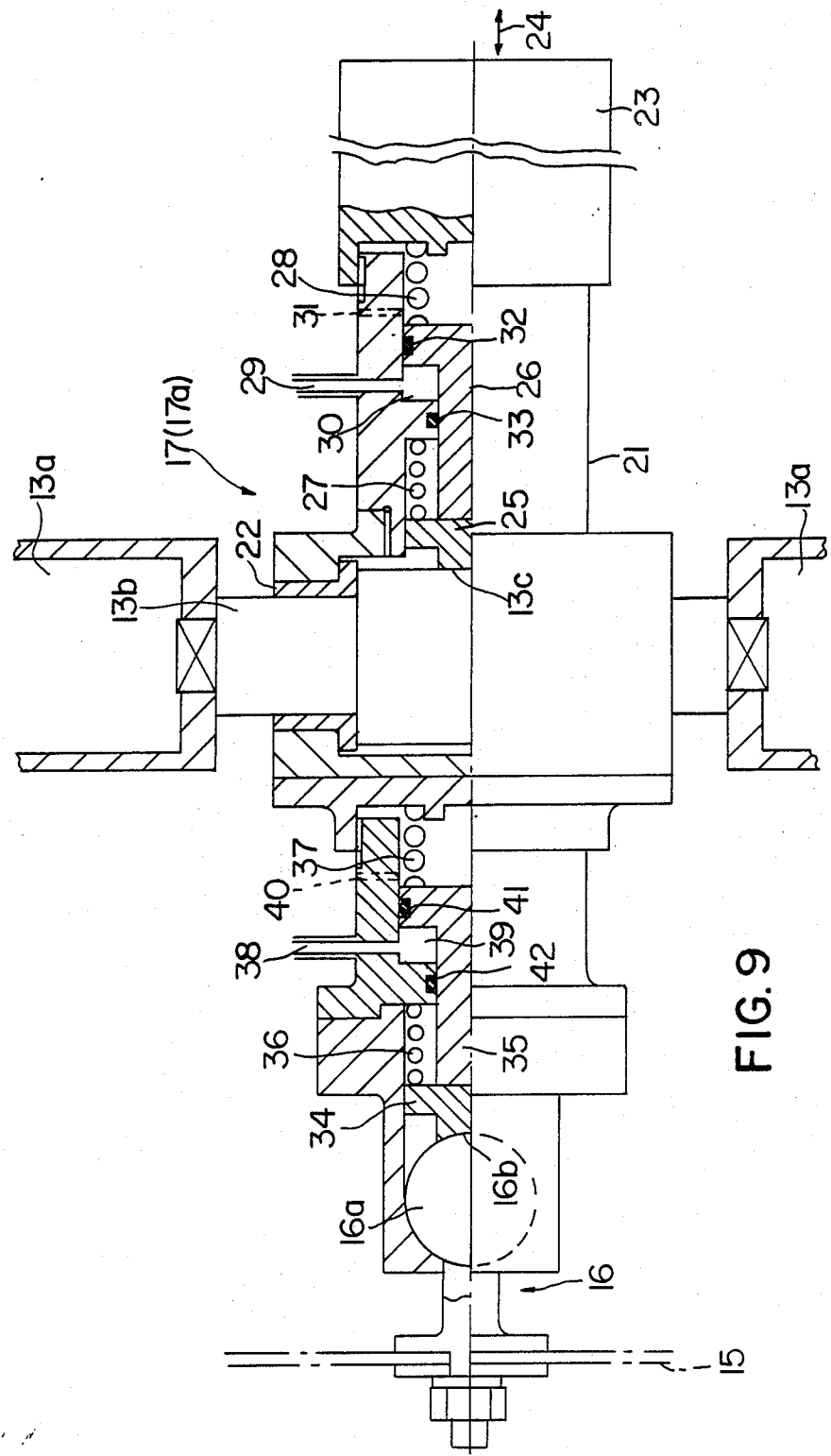
FIG. 9 is an enlarged, partially cross-sectional view taken along Line IX—IX of FIG. 6.

As shown in FIG. 9, which is an enlarged cross-sectional view taken along Line IX—IX of FIG. 6, the fixing device 17 has a hollow, elongated shaft 21 which is rotatably supported by the fixed shaft 13b through sleeve bearings 22 which fit over the fixed shaft 13b. The universal joint 16 is rotatably mounted on one end of the elongated shaft 21, while a counterweight 23 is slidably mounted on the other end thereof. The counterweight 23 can be moved back and forth in the longitudinal direction of the elongated shaft 21 as shown by the arrow 24 so that its longitudinal position and therefore the torque exerted thereby can be adjusted.

A first piston 25 and a second piston 26 are housed inside the elongated shaft 21 and are slidable in the longitudinal direction thereof. Both pistons 25 and 26 are biased towards the left in FIG. 9 by biasing springs 27 and 28, respectively. Biasing spring 27 presses the left end of the first piston 25 against a contact surface 13c formed on an enlarged portion of the fixed shaft 13b, while spring 28 presses the second piston 26 against the right side of the first piston 25. An inlet 29 for compressed air is formed in the elongated shaft 21 between the outside thereof and a chamber 30 which is formed between the elongated shaft 21 and the front surface of the second piston 26. The outer end of the inlet 29 is connected to an unillustrated source of compressed air. Compressed air which has been introduced into the chamber 30 can be discharged therefrom through a purge port 31 which is formed in the elongated shaft 21. Compressed air is prevented from leaking from chamber 30 by O-rings 32 and 33 which are installed in corresponding grooves in the second piston 26 and the elongated shaft 21, respectively.

A third piston 34 and a fourth piston 35 are slidably disposed inside the elongated shaft 21 at the end thereof which supports the universal joint 16. The universal joint 16 has a ball-shaped portion 16a having a contact surface 16b, and the left end of the third piston 34 has a concave surface having the same curvature as the ball-shaped portion 16a. The concave surface of the third piston 34 is biased against the contact surface 16b of the ball-shaped portion 16a of the universal joint 16 by a biasing spring 36, and the fourth piston 35 is biased against the right side of the third piston 34 by another biasing spring 37. A chamber 39 is formed between the inside of the elongated shaft 21 and the front surface of the fourth piston 35, and this chamber 39 is connected to an unillustrated source of compressed air by an inlet 38 which is formed in the elongated shaft 21. Compressed air can be discharged from the chamber 39 through a purge port 40 which is formed in the elongated shaft 21. Compressed air is prevented from leaking from the chamber 39 by O-rings 41 and 42 which are disposed in grooves formed in the outer portion of the fourth piston 35 and the inner portion of the elongated shaft 21, respectively.

When no compressed air is introduced into chamber 30, the first piston is firmly pressed against the contact surface 13c of the fixed shaft 13b by biasing spring 27 and by the second piston 26, and in this state, the elongated shaft 21 is incapable of rotation about the fixed shaft 13b. However, when compressed air is introduced into chamber 30, air pressure inside the chamber 30 forces the second piston 26 to move to the right in FIG. 6 so that the first piston 25 is pressed against the fixed shaft 13b only by biasing spring 27. In this state, the elongated shaft 21 can be manually rotated about the fixed shaft 13b. When it is desired to stop the elongated shaft 21 in a particular position, it is necessary only to discharge compressed air from chamber 30 through purge port 31, and the second piston 26 will return to the position shown in FIG. 9 in which it prevents the rotation of the elongated shaft 21.

Similarly, when no compressed air is introduced into chamber 39, the third piston 33 is pressed firmly against the ball-shaped portion 16a of the universal joint 16 by biasing spring 36 and the fourth piston 35, and in this state, the universal joint 16 is incapable of rotation. However, when compressed air is introduced into chamber 39 via inlet 38, the fourth piston 35 is pushed to the right in FIG. 9 by air pressure and the third piston 34 is pressed against the ball-shaped portion 16a only by biasing spring 36. In this state, the universal joint 16 can be manually rotated with respect to the elongated shaft 21 in any direction, whereby the orientation of the bracket 15 can be freely adjusted. If the compressed air within the chamber 39 is discharged through purge port 40, the fourth piston 35 will revert to the position shown in FIG. 9, and the bracket 15 can be held at a desired angle with respect to the elongated shaft 21.

When compressed air is introduced into chamber 30, the elongated shaft 21 can be rotated in the direction of arrow 43 between positions 44 and 45 in FIG. 8, which is a side elevation taken along Line VIII—VIII of FIG. 6. When the elongated shaft 21 is in position 44, the location of a glass window assembly held by the bracket 15 will be as shown by line 46, and when the elongated shaft 21 is in position 45, the location of a glass window assembly will be as shown by line 47, provided that the bracket 15 is perpendicular with respect to the longitudinal axis of the elongated shaft 21.

In FIG. 8, the vertical line marked with an A indicates the outer limit of horizontal movement of a glass window assembly held by the suction cups 14. B indicates the desired minimum clearance between the top edge of a glass window assembly and the lower edge of the guide rails 12 on which the carriage 13 is slidably mounted so that the glass window assembly will not strike the guide rails 12 when the carriage 13 is moved horizontally.

The operation of the apparatus will be explained hereinunder with reference to FIGS. 4 and 5. As can be seen, a plurality of window assemblies 5 which are to be fitted in window frames 18a on the car are beforehand placed on the truck 1. The operator on the truck 1 then manually brings the traverser 8 to a position in front of the first glass window assembly 5 and then operates the hoist 11 such as to move the lift 10 to a suitable position. Next, the operator swings the fixing device 17 about a horizontal axis until the bracket 15 confronts the glass window assembly 5. Then, the operator rotates the bracket 15 with respect to the fixing device 17 by means of the universal joint 16 while manually moving the carriage 13 until the bracket is in the position depicted by phantom lines in FIG. 5 and all vacuum suction cups 14 perfectly contact the glass window assembly 5. Then, the operator opens a vacuum cock so that vacuum is transmitted to all vacuum suction cups 14 thus allowing the glass window assembly to be securely held by the vacuum suction cups 14. In this state, the fixing device 17 on the universal joint 16 is set such as to fix the thus held glass window assembly, thereby preventing the bracket 15 from rotating with respect to the fixing device 17. The glass window assembly 5 is thus securely held by the vacuum suction cups 14 in the position shown by the phantom lines in FIG. 5. The operator then manually moves the carriage 13 and the glass window assembly 5 to the right in FIG. 5. At an appropriate location, the operator pivots the fixing device 17 about a horizontal axis as shown by the curved two-headed arrow in FIG. 4 until the glass window assembly 5 confronts the car 18. Then, the electric hoist 11 is operated to move the lift 10 and, hence, the glass window assembly 5 upwardly to the level of the window frame 18a on the car 18. Subsequently, the traverser 8 is moved to the position such as to bring the glass window frame to a position in front of the window frame 18a and the carriage 13 is moved to bring the glass window assembly 5 into contact with the window frame 18a as shown by the solid lines in FIG. 5. Subsequently, after loosening the fixing device 17 so that the universal joint 16 can rotate with respect to the fixing device 17, the position of the glass window assembly 5 is adjusted minutely such that the assembly 5 is correctly registered with the window frame 18a on the car 18 and the fixing device 17 is set again to fix the glass window assembly at this position. Thereafter, the glass window assembly 5 is attached to the window frame 18a on the car 18 in a manner which is known per se, and the vacuum in the vacuum suction cups 14 is broken to allow the vacuum suction cups to be separated from the glass window assembly 5, thus completing the mounting.

In the above-described embodiment, the structure of the present invention is such that a window assembly 5 is rotated about a horizontal axis by the fixing device 17. FIGS. 10 through 12 illustrate a portion of a second embodiment of the present invention in which a fixing device 17a can be rotated about a vertical axis. As shown in FIG. 10, which is a front elevation of a portion of this embodiment, a mobile carriage 50 which can slide along a pair of guide rails 12 has a horizontal support 51 secured to its upper end. A vertical rectangular frame 52 is pivotably supported by the horizontal support 51 by means of a shaft 53, whereby the rectangular frame 52 can pivot about a vertical axis. A lower horizontal support 54 extends between the two vertical sides of the rectangular frame 52 in the midportion thereof, and a vertical fixed shaft 55 extends between the lower horizontal support 54 and the lower end of the rectangular frame 52. A fixing device 17a is pivotably mounted on the fixed shaft 55 in the same manner as the fixing device 17 is mounted on the fixed shaft 13b of FIG. 9. The structure of fixing device 17a is identical to that of fixing device 17, and the only difference therebetween is that fixing device 17a is rotatable about a vertical axis instead of a horizontal axis. The structure of this embodiment is otherwise identical to that of the first embodiment.

As shown in FIG. 11, which is a cross-sectional view taken along Line XI—XI of FIG. 10, in order to prevent the bracket 15 from striking the vertical sides of the rectangular fame 52 as the fixing device 17a pivots, the rectangular frame 52 must have a width which is no greater than the diameter of a circle C centered on the fixed shaft 55 and defining the path of movement of the outer ends of the elongated shaft 21.

The operation of this embodiment is similar to the operation of the first embodiment with the exception that a glass window assembly 5 is swung by the fixing device 17a about a vertical axis instead of a horizontal axis between a first position in which the suction cups 14 can be brought into contact with a glass window assembly 15 atop the truck 1 and a second position in which the glass window assembly 5 is substantially parallel to a window frame 18a on which the glass window assembly 5 is to be mounted. In the embodiment of FIGS. 10–12, the angle of rotation of the fixing device 17a about the fixed shaft 55 is restricted to at most 180° by the vertical sides of the rectangular fame 52, so rotation by more than this amount is accomplished by the combined rotation of the fixing device 17a about the fixed shaft 55 and of the rectangular frame 52 with respect to the upper horizontal support 51. However, if the rectangular frame 52 is rotatably supported by the upper horizontal support 51 so as to be able to freely rotate about a vertical axis by an amount (such as 360°) sufficient to pivot the bracket 15 between a first and a second position as described above, it is possible to delete the fixed shaft 55 and to secure the fixing device 17a to the rectangular frame 52.

Although the invention has been described with specific reference to mounting of a glass window assembly on a car well, the apparatus of the invention can be applied also to the handling of various similar large-sized articles when they are to be attached to the walls of various objects such as houses and other buildings.

What is claimed is:

1. An apparatus for handling a large-sized article comprising:
   a mobile truck;
   a support structure which is mounted on said mobile truck;
   a traversing device which is movably mounted on said support structure for lateral movement;
   a lifting device which is movably mounted on said traversing device for vertical movement independently of the lateral movement;
   a carriage movably mounted on said lifting device for fore and aft movement independently of the lateral and vertical movements;
   a bracket having suction cups mounted thereon;
   a universal joint which is secured to said bracket; and
   a fixing device to which said bracket is rotatably connected by said universal joint for fixing and releasing the rotation of said bracket with respect to said fixing device, said fixing device being pivotably mounted on said carriage so as to be able to rotate between a first position in which said suction cups on said bracket can be brought into contact with an object of said mobile truck and a second position in which said bracket is substantially parallel to a desired position to which the object is to be moved.

2. An apparatus as claimed in claim 1 wherein:
   said mobile truck comprises a wheeled truck which can be stood up by a human operator;
   said traversing device comprises a first frame which is movably supported by said support structure so that a human operator can manually move said first frame laterally along said support structure when standing upon said mobile truck;
   said lifting device comprises a second frame which is movably supported by said first frame and means for raising and lowering said second frame along said first frame; and
   said carriage comprises a third frame which is movably supported by said second frame so that a human operator can manually move said third frame in a fore and aft direction along said second frame while standing upon said mobile truck.

3. An apparatus as claimed in claim 1, wherein said fixing device is rotatable about a horizontal axis.

4. An apparatus as claimed in claim 1, wherein said fixing device is rotatable about a vertical axis.

5. An apparatus as claimed in claim 1, wherein said fixing device includes a rotation-preventing device for enabling and disenabling the rotation of said fixing device with respect to said carriage.

6. An apparatus as claimed in claim 5, wherein said rotation-prevention device is powered by compressed air.

7. An apparatus as claimed in claim 6, further comprising a fixed shaft which is secured to said carriage and which rotatably supports said fixing device, wherein said rotation-preventing device comprises a movable first piston which is biased against said fixed shaft, and a second piston which is slidable under pneumatic force between a first position in which it presses against said first piston and a second position in which it does not contact said first piston, said fixing device being prevented from rotation with respect to said fixed shaft when said second piston is in its first position and said fixing device be able to be manually rotated with respect to said fixed shaft when said second piston is in its second position.

* * * * *

UNITED STATES PATENT AND TRADEMARK OFFICE
CERTIFICATE OF CORRECTION

PATENT NO. : 4,884,938

DATED : December 5, 1989

INVENTOR(S) : Yoshitada Fujita, Sadashi Hanada, and Yoshiaki Yamamoto

It is certified that error appears in the above-identified patent and that said Letters Patent is hereby corrected as shown below:

Column 7, line 36, change "up" to --upon--.

Column 8, line 22, change "rotation-prevention" to --rotation-preventing--.

Signed and Sealed this

First Day of January, 1991

Attest:

HARRY F. MANBECK, JR.

Attesting Officer

Commissioner of Patents and Trademarks